US010372387B2

(12) United States Patent
Arai

(10) Patent No.: US 10,372,387 B2
(45) Date of Patent: Aug. 6, 2019

(54) INFORMATION PROCESSING SYSTEM INCLUDING DISTRIBUTION SETTING INDICATING WHETHER OR NOT TO AUTOMATICALLY DISTRIBUTE THE INFORMATION, INFORMATION PROCESSING APPARATUS, AND INFORMATION PROCESSING METHOD

(71) Applicant: Shohei Arai, Kanagawa (JP)

(72) Inventor: Shohei Arai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/039,444

(22) Filed: Jul. 19, 2018

(65) Prior Publication Data

US 2019/0042166 A1    Feb. 7, 2019

(30) Foreign Application Priority Data

Aug. 1, 2017   (JP) .................................. 2017-149420

(51) Int. Cl.
*G06F 3/12*    (2006.01)
*H04L 29/08*    (2006.01)
*H04L 12/26*    (2006.01)

(52) U.S. Cl.
CPC .......... *G06F 3/1207* (2013.01); *G06F 3/1259* (2013.01); *G06F 3/1273* (2013.01); *H04L 43/00* (2013.01); *H04L 67/1097* (2013.01); *G06F 3/1288* (2013.01)

(58) Field of Classification Search
None
See application file for complete search history.

(56) References Cited

U.S. PATENT DOCUMENTS

| 2013/0132337 | A1 | 5/2013 | Masuda |
| 2013/0218920 | A1 | 8/2013 | Satoh |
| 2015/0347405 | A1 | 12/2015 | Satoh |
| 2016/0034984 | A1 | 2/2016 | Masuda |

(Continued)

FOREIGN PATENT DOCUMENTS

| CN | 201610389956.4 | * | 6/2016 |
| JP | 2001-197061 | | 7/2001 |

(Continued)

*Primary Examiner* — Lennin R Rodriguezgonzalez
*Assistant Examiner* — Lennin R Rodriguez
(74) *Attorney, Agent, or Firm* — Harness, Dickey & Pierce, P.L.C.

(57) ABSTRACT

An information processing system includes a first server, a second server, and a third server. The first server generates first use log information indicating a log of uses of an output device collected for a first time period. The second server generates second use log information indicating a log of uses of the output device for a second time period, from the first use log information of the output device for the first time, the second time period being longer than the first time period, and sends a notification indicating completion of generation of the second use log information. The third server generates information to be provided to a user, using the second use log information of the output device for the second time period that is obtained from the second server, in response to the notification indicating completion of generation of the second use log information.

9 Claims, 15 Drawing Sheets

(56) References Cited

U.S. PATENT DOCUMENTS

2018/0091370 A1   3/2018  Arai
2018/0276709 A1*  9/2018  Li ..................... G06Q 30/0248

FOREIGN PATENT DOCUMENTS

| JP | 2002-267491 | 9/2002 |
| JP | 2013-131210 | 7/2013 |
| JP | 2013-171426 | 9/2013 |
| JP | 2018-055499 | 4/2018 |

* cited by examiner

| DEVICE ID | MAC ADDRESS | DAILY DATA ID | ... |
|---|---|---|---|
| AAA | 00-00-5E-××-53-01 | 1 | ... |
| BBB | 00-00-5E-××-53-02 | 2 | ... |
| CCC | 00-00-5E-××-53-03 | 3 | ... |
| DDD | 00-00-5E-××-53-04 | 4 | ... |

FIG. 8

| DAILY DATA ID | YEAR-MONTH-DAY | COUNTER VALUE | | | | | | |
|---|---|---|---|---|---|---|---|---|
| | | TOTAL | BY FUNCTION (PRINT) | BY FUNCTION (COLOR SCAN) | NUMBER OF COLOR PRINTED SHEETS | NUMBER OF MONOCHROME PRINTED SHEETS | NUMBER OF A3 PRINTED SHEETS | NUMBER OF A4 PRINTED SHEETS | ... |
| 1 | 2017-01-01 | 804 | 480 | 324 | 45 | 435 | 35 | 445 | ... |
| 2 | 2017-01-02 | 909 | 477 | 432 | 53 | 424 | 24 | 453 | ... |
| 3 | 2017-01-03 | 711 | 469 | 242 | 25 | 444 | 44 | 425 | ... |
| 4 | 2017-01-04 | 958 | 906 | 52 | 345 | 561 | 61 | 845 | ... |
| ... | ... | ... | ... | ... | ... | ... | ... | ... | ... |

FIG. 9

| GROUP ID | GROUP NAME | ADDRESS | TELEPHONE NUMBER | E-MAIL ADDRESS | CLOSING DATE | ... |
|---|---|---|---|---|---|---|
| 111 | ○○ CONSTRUCTION COMPANY | ○○ PREFECTURE... | ○○○-○○ | marumaru@○○.co.jp | 25TH OF EVERY MONTH | ... |
| 222 | ×× BUILDER'S OFFICE | ×× PREFECTURE... | ×××-×× | batsubatsu@××.co.jp | 25TH OF EVERY MONTH | ... |
| 333 | △△ CHEMICAL COMPANY | △△ PREFECTURE... | △△△-△△ | sankakusankaku@△△.co.jp | 15TH OF EVERY MONTH | ... |

FIG. 10

| DEVICE ID | GROUP ID | MAC ADDRESS | DAILY DATA ID | MONTHLY DATA ID |
|---|---|---|---|---|
| AAA | 111 | 00-00-5E-xx-53-01 | 1 | 1 | ... |
| BBB | 111 | 00-00-5E-xx-53-02 | 2 | 2 | ... |
| CCC | 111 | 00-00-5E-xx-53-03 | 3 | 3 | ... |
| DDD | 222 | 00-00-5E-xx-53-04 | 4 | 4 | ... |

FIG. 11

| DEVICE ID | UPDATED DATE | GROUP ID | | |
|---|---|---|---|---|
| AAA | 2016/12/10 | 111 | ... | ... |
| BBB | 2016/12/10 | 111 | ... | ... |
| CCC | 2015/11/10 | 111 | ... | ... |
| DDD | 2015/04/01 | 222 | ... | ... |

FIG. 12

| MONTHLY DATA ID | YEAR AND MONTH | TOTAL | BY FUNCTION (PRINT) | BY FUNCTION (COLOR SCAN) | NUMBER OF COLOR PRINTED SHEETS | NUMBER OF MONOCHROME PRINTED SHEETS | NUMBER OF A3 PRINTED SHEETS | NUMBER OF A4 PRINTED SHEETS | ... |
|---|---|---|---|---|---|---|---|---|---|
| 1 | 2016-09 | 24253 | 14230 | 10023 | 1200 | 13030 | 200 | 14000 | ... |
| 2 | 2016-10 | 24979 | 13656 | 11323 | 1244 | 12412 | 220 | 13100 | ... |
| 3 | 2016-11 | 28717 | 15483 | 13234 | 1241 | 14242 | 230 | 15000 | ... |
| 4 | 2016-12 | 26930 | 14586 | 12344 | 1343 | 13243 | 190 | 14300 | ... |
| 5 | 2017-01 | 26574 | 13281 | 13293 | 1248 | 12033 | 240 | 13200 | ... |
| ... | ... | ... | ... | ... | ... | ... | ... | ... | ... |

FIG. 13

| GROUP ID | USER ID | USER NAME | PASSWORD | REPORT LANGUAGE SETTING | REPORT NOTIFICATION SETTING | REPORT DISTRIBUTION SETTING | USER E-MAIL ADDRESS |
|---|---|---|---|---|---|---|---|
| 111 | aaa | SUZUKI | ○○○ | JP | ON | ON | SuzukiOO@OO.co.jp |
| 111 | bbb | SATOH | ×× × | JP | OFF | OFF | satoh××@×××.co.jp |
| 222 | ccc | NOMURA | △△△ | US | ON | OFF | Nomura△△@△△△.co.jp |

COUNTER CUBE (OLAP CUBE)    1001

| GROUP NAME | YEAR AND MONTH | DEVICE | COUNTER TYPE | COUNT VALUE |
|---|---|---|---|---|

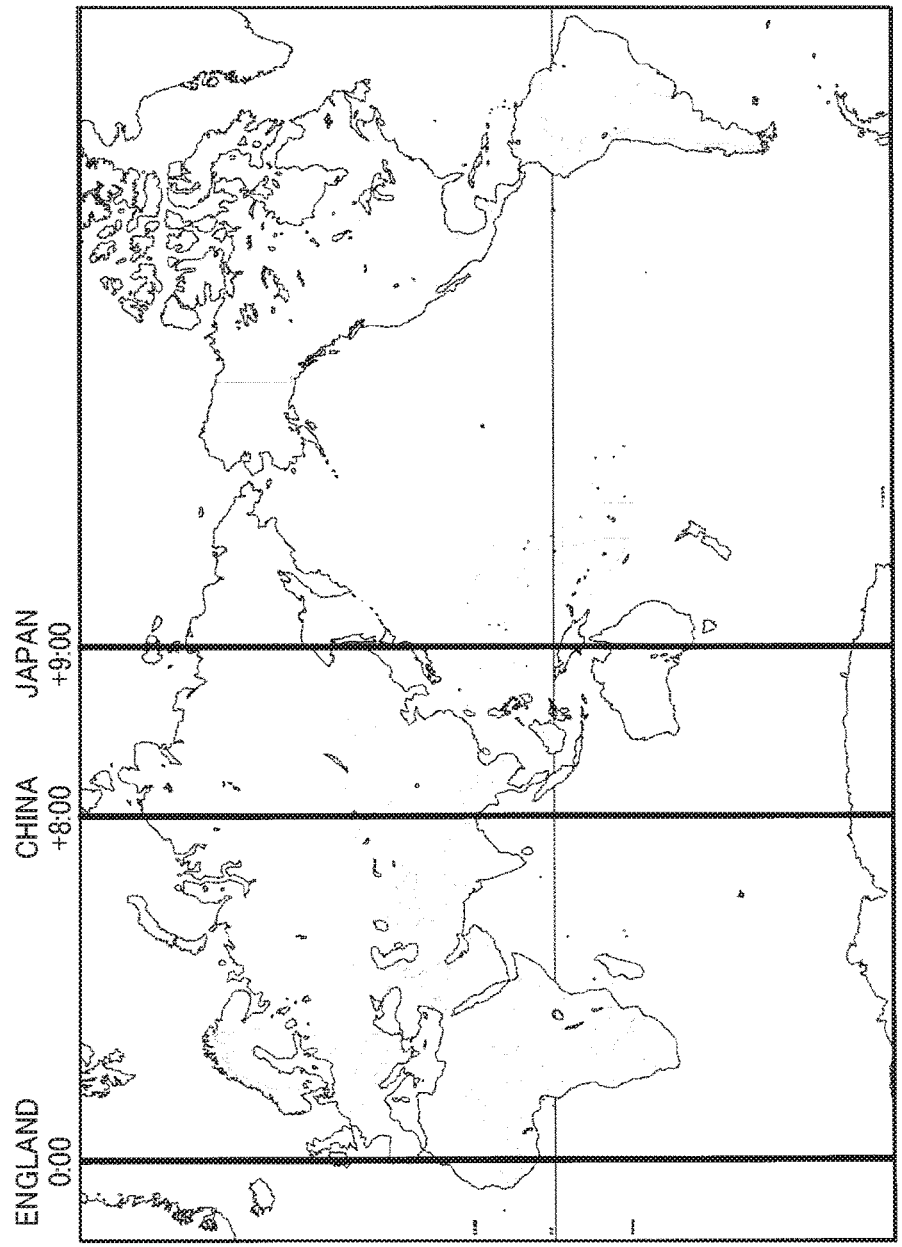

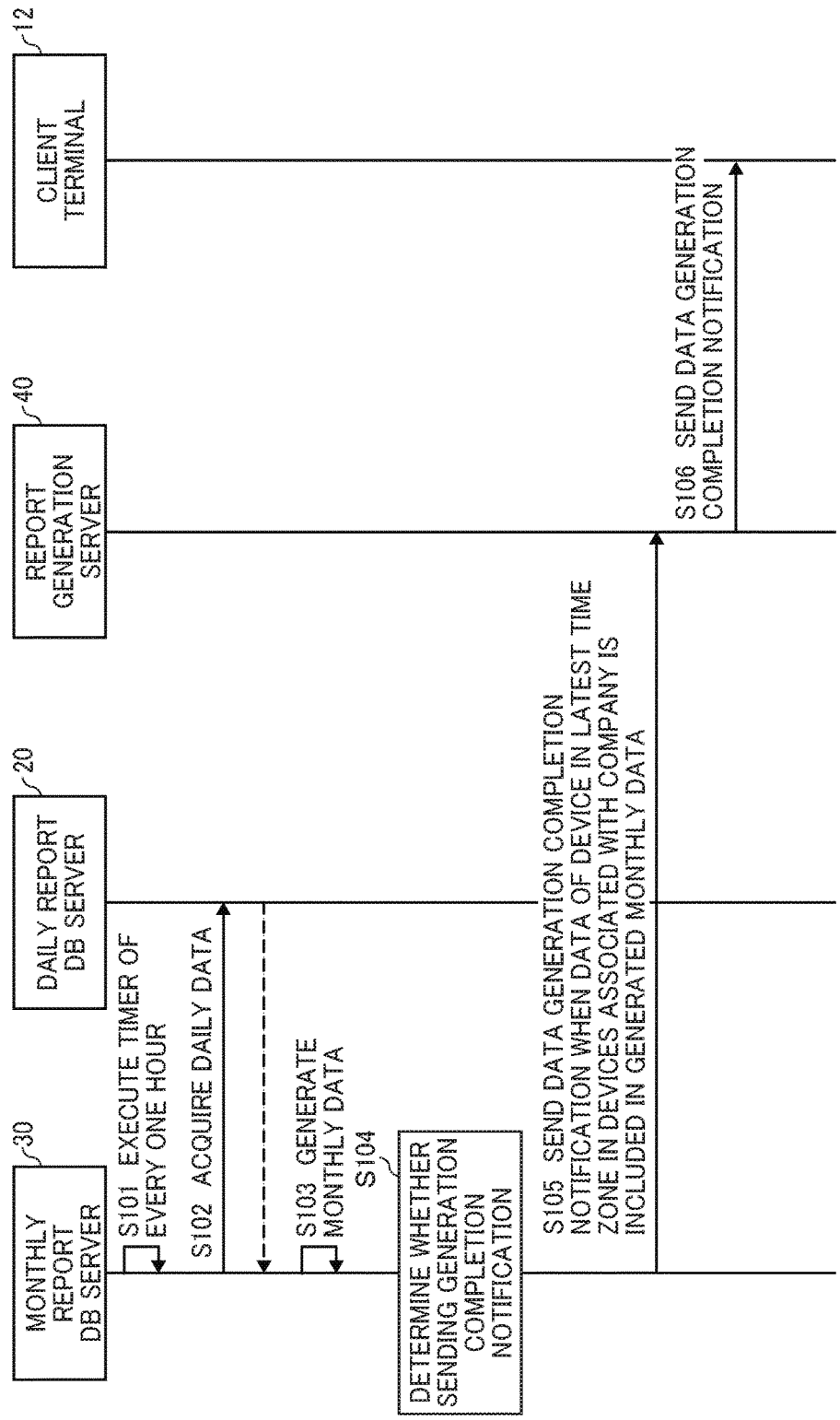

FIG. 22

| DEVICE ID | MAC ADDRESS | DAILY DATA ID | TIME ZONE | ... |
|---|---|---|---|---|
| AAA | 00-00-5E-××-53-01 | 1 | +9:00 | ... |
| BBB | 00-00-5E-××-53-02 | 2 | +1:00 | ... |
| CCC | 00-00-5E-××-53-03 | 3 | +0:00 | ... |
| DDD | 00-00-5E-××-53-04 | 4 | -8:00 | ... |

FIG. 23

| DATA NAME | DESCRIPTION |
|---|---|
| Device Id | ID OF DEVICE |
| Device Serial Number | SERIAL NUMBER OF DEVICE |
| Registration Date | INSTALLATION DATE OF DEVICE |
| Location | INSTALLATION PLACE OF DEVICE |
| Vendor Name | VENDOR NAME OF DEVICE |
| Acquisition Date | DATE WHEN COUNTER IS STARTED TO ACQUIRE FROM DEVICE |
| Appliance Serial Number | SERIAL NUMBER OF APPLIANCE |
| Company Id | ID OF COMPANY |
| Company Name | COMPANY NAME |
| Service Provider Id | ID OF SALES COMPANY TO WHICH COMPANY BELONGS |
| Regional HQ Id | ID TO WHICH SALES COMPANY TO WHICH COMPANY BELONGS BELONGS |
| Date | YEAR AND MONTH OF REPORT |
| Auth Name | ID OF USER |
| Username | USER NAME |

US 10,372,387 B2

INFORMATION PROCESSING SYSTEM INCLUDING DISTRIBUTION SETTING INDICATING WHETHER OR NOT TO AUTOMATICALLY DISTRIBUTE THE INFORMATION, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2017-149420, filed on Aug. 1, 2017, in the Japan Patent Office, the entire disclosure of which is hereby incorporated by reference herein.

BACKGROUND

Technical Field

The present invention relates to an information processing system, an information processing apparatus, and an information processing method.

Description of the Related Art

In a conventional reporting system, the system generates a report of use information of a device such as the number of printed sheets of a printer, and sequentially or periodically generates a report for distribution to a user.

SUMMARY

Example embodiments of the present invention include an information processing system including a first server, a second server, and a third server. The first server includes first circuitry configured to generate and store in a first memory, first use log information indicating a log of uses of an output device collected for a first time period. The second server includes second circuitry configured to: generate and store in a second memory, second use log information indicating a log of uses of the output device for a second time period, from the first use log information of the output device for the first time period that is obtained from the first server, the second time period being longer than the first time period; and send a notification indicating completion of generation of the second use log information. The third server includes third circuitry configured to generate information to be provided to a user, using the second use log information of the output device for the second time period that is obtained from the second server, in response to the notification indicating completion of generation of the second use log information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram of an example of daily data;

FIG. 9 is a conceptual diagram of an example of group information;

FIG. 10 is a conceptual diagram of an example of device information;

FIG. 11 is a conceptual diagram of an example of device history information;

FIG. 12 is a conceptual diagram of an example of monthly data;

FIG. 13 is a conceptual diagram of an example of user setting;

FIG. 20 is a diagram for explaining a time difference to be taken into consideration according to a second embodiment;

FIG. 21 is a sequence diagram of an example of report processing, according to the second embodiment;

FIG. 22 is a conceptual diagram of an example of time zone information, according to the second embodiment; and FIG. 23 is a conceptual diagram of an example of information stored in a monthly setting storage.

Figure 1:
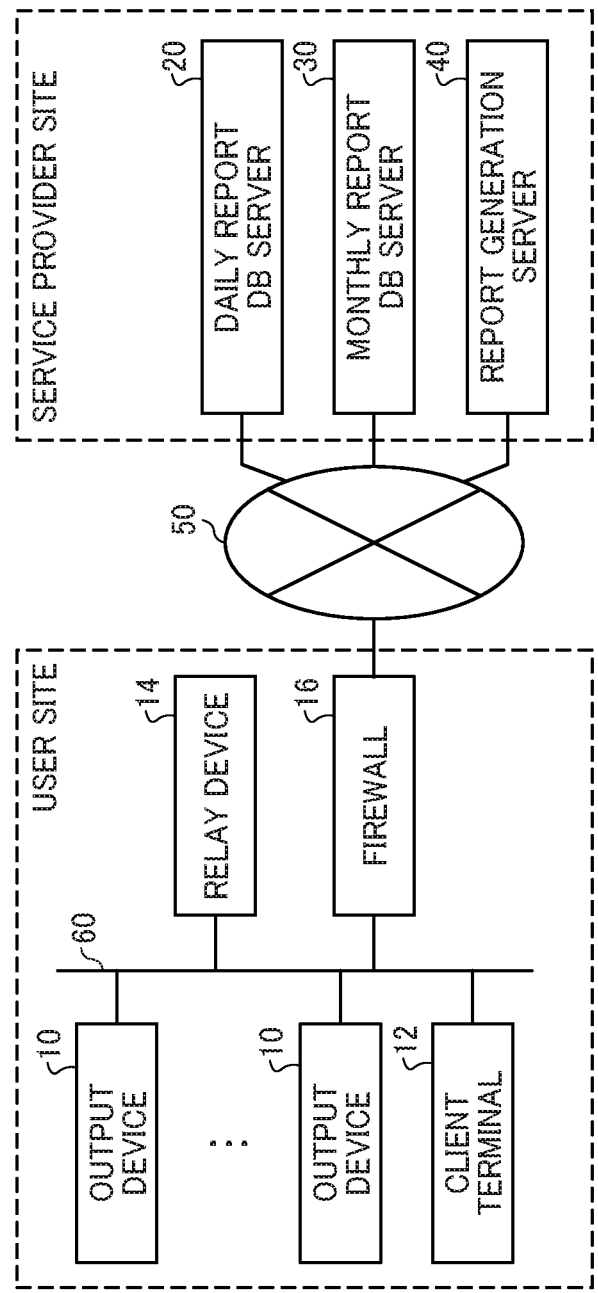
FIG. 1 is a configuration diagram of an example of an information processing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The reporting system is based on the premise that the generated report is unilaterally distributed from the server to the user. However, the user may want to access the reporting system at a time when the user wishes to check the report for its content. In such a case, since the system cannot predict when the user will access the system, the system generates a report based on information transmitted from the device to be managed and accumulated in advance at the time when the user has accessed the system and requested the report content.

However, if the user wishes to check a monthly report, for example, if the monthly report is generated from daily data when the user requests a report, it takes a longer time to generate a report as the number of devices to be managed or the size of data to be reported are increased. In view of this, a monthly data may be generated in advance to be used for generating a monthly report that covers a longer period than a daily report, and the monthly data is used when the user requests the monthly report. This can shorten the time to provide the report content to the user.

Even in such a case, the user is not able to know when generation of the monthly data has been completed. Accordingly, a time lag may occur from the generation of the monthly data that covers a longer period than the daily data, until the user requests to check the monthly report.

Hereinafter, embodiments of the present invention will be described with reference to the drawings.

[First Embodiment]
<System Configuration>

FIG. 1 is a configuration diagram of an example of an information processing system according to a first embodiment. An information processing system 1 in FIG. 1 includes a user site and a service provider site which are connected via a network 50 such as the Internet. The user is a user for a service provided by a service provider site, examples of which include an organization such as a company, a group, an educational institution, an administrative agency and a department. The user site includes one or more output devices 10, a client terminal 12, a relay device 14, and a firewall 16 which are connected to one another via a network 60 such as a local area network (LAN). Further, the service provider site includes a daily report database (DB) server 20, a monthly report DB server 30, and a report generation server 40 which are connected to the network 50.

The output device 10 is an image forming device such as a laser printer or a multifunction peripheral (multifunction printer), a projector, an electronic whiteboard, a video conference device, a camera, an industrial device or a home appliance having a communication function, a medical device having a communication function, or the like.

The client terminal 12 is an information processing apparatus such as a smartphone, a mobile phone, a tablet personal computer (PC), a desktop PC, or a notebook PC used by a user. The client terminal 12 includes an application having a screen display function such as a web browser. The application is not limited to the web browser as long as the application has a function to display a report received from the report generation server 40 on a screen.

Further, the relay device 14 collects information (a counter value) indicating a use record of the output device 10 from the output device 10, and collectively transmits the collected information to the daily report DB server 20. Note that the output device 10 may transmit such information (counter value) by itself to the daily report DB server 20 without through the relay device 14. The information processing system 1 may not include the relay device 14 in some cases.

The daily report DB server 20 accumulates the counter values of the output device 10 received from a user site in an online transaction processing (OLTP) table as described below. The OLTP table accumulates daily data of the counter values of the output device 10.

The monthly report DB server 30 generates an online analysis processing (OLAP) cube described below using the OLTP table of the daily report DB server 20. The OLAP cube accumulates monthly data generated on the basis of a closing date from the daily data accumulated in the OLTP table.

Further, the report generation server 40 acquires the daily data and the monthly data of each group that uses the output device 10 from the OLTP table of the daily report DB server 20 or the OLAP cube of the monthly report DB server 30. The report generation server 40 generates screen data of a report for displaying the daily data or the monthly data on the client terminal 12, and transmits the screen data to the client terminal 12.

The configuration of the information processing system 1 illustrated in FIG. 1 is an example, and one or more server devices (a proxy server, a gateway server, and the like) may intervene between the user site and the daily report DB server 20. Further, the client terminal 12 may be located outside the user site, and may be, for example, connected to the network 50. The daily report DB server 20, the monthly report DB server 30, and the report generation server 40 in FIG. 1 may be integrated into and implemented by one information processing apparatus or may be distributed into and implemented by a plurality of information processing apparatuses.

For example, a part or all of the functions of the daily report DB server 20 may be provided in the monthly report DB server 30, the report generation server 40, or another server. A part or all of the functions of the monthly report DB server 30 may be provided in the daily report DB server 20, the report generation server 40, or another server. Further, a part or all of the functions of the report generation server 40 may be provided in the daily report DB server 20, the monthly report DB server 30, or another server.

As described above, the information processing system 1 collects the daily data of the output device 10 in the daily report DB server 20. The monthly report DB server 30 acquires the daily data from the daily report DB server 20, and generates the monthly data of each group or each output device 10. Then, the report generation server 40 generates a report including the monthly data of each group or each output device 10 as information, and causes the web browser mounted on the client terminal 12 to display the report.

The information processing system 1 in FIG. 1 includes the daily report DB server 20, the monthly report DB server 30, and the report generation server 40, which are connected to the network 50 such as the Internet outside the user site. The information processing system 1 in FIG. 1 is an example in which the daily report DB server 20, the monthly report DB server 30, and the report generation server 40 are provided in a so-called cloud environment. Note that the daily report DB server 20, the monthly report DB server 30, and the report generation server 40 may be provided inside the user site (on-premises site).

<Hardware Configuration>
<<Computer>>

Figure 2:
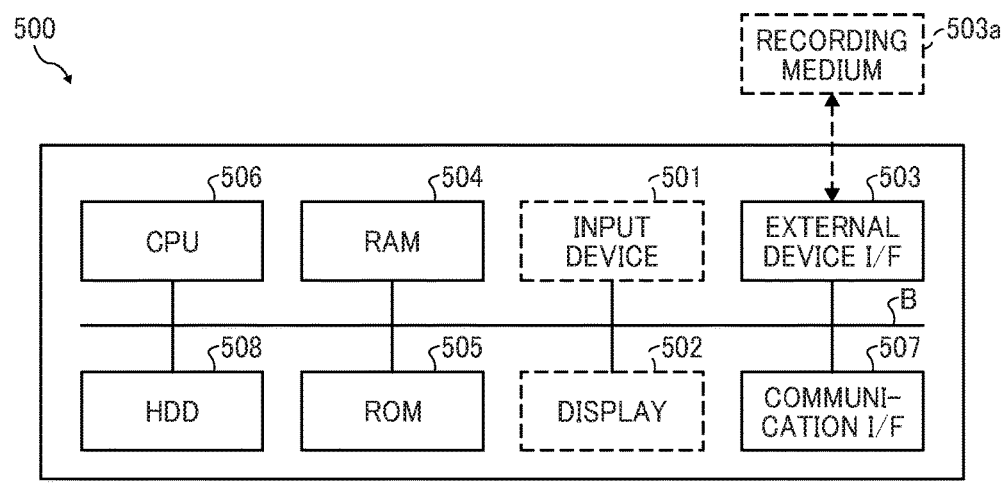
FIG. 2 is a hardware configuration diagram of an example of a computer.

The client terminal 12 in FIG. 1 is implemented by, for example, a computer having a hardware configuration illustrated in FIG. 2. One or more information processing apparatuses that implement the daily report DB server 20, the monthly report DB server 30, and the report generation server 40 are implemented by the computer having a hardware configuration illustrated in FIG. 2.

FIG. 2 is a hardware configuration diagram of an example of a computer. A computer 500 in FIG. 2 includes an input device 501, a display 502, an external device interface (I/F) 503, a random-access memory (RAM) 504, a read-only memory (ROM) 505, a central processing unit (CPU) 506, a communication I/F 507, a hard disk drive (HDD) 508, and the like, which are mutually connected via a bus B. Note that the input device 501 and the display 502 may be connected for use as required.

The input device 501 includes a keyboard, a mouse, a touch panel, and the like, and is used by the user to input an instruction to generate operation signals. The display 502 includes a display and the like, and displays a processing result by the computer 500.

The communication I/F 507 is an interface for connecting the computer 500 to various networks. The computer 500 performs data communication via the communication I/F 507.

Further, the HDD 508 is an example of a nonvolatile storage device that stores programs and data. The stored programs and data include an operating system (OS) that is basic software for controlling the entire computer 500, application software (hereinafter simply referred to as application) for providing various functions on the OS, and the like. Note that the computer 500 may use a drive device using a flash memory as a storage medium (for example, a solid-state drive: SSD) in place of the HDD 508.

The external device I/F 503 is an interface with an external device. The external device includes a recording medium 503a or the like. The computer 500 reads data from and/or write data on the recording medium 503a via the external device I/F 503. Examples of the recording medium 503a include a flexible disk, a compact disc (CD), a digital versatile disc (DVD), a secure digital (SD) memory card, and a universal serial bus (USB) memory.

The ROM 505 is an example of a nonvolatile semiconductor memory (storage device) that holds programs and data even when the power is turned off. The ROM 505 stores programs and data such as a basic input/output system (BIOS), OS settings, and network settings, which are executed at the start of the computer 500. The RAM 504 is an example of a volatile semiconductor memory (storage device) that temporarily holds programs and data.

The CPU 506 is an arithmetic device that reads the programs and data from the storage device such as the ROM 505 and the HDD 508 onto the RAM 504 and executes processing to implement control and functions of the entire computer 500. The client terminal 12, the daily report DB server 20, the monthly report DB server 30, and the report generation server 40 implement various types of processing to be described below by the hardware configuration of the computer 500 illustrated in FIG. 2.

<<Output Device>>

Figure 3:
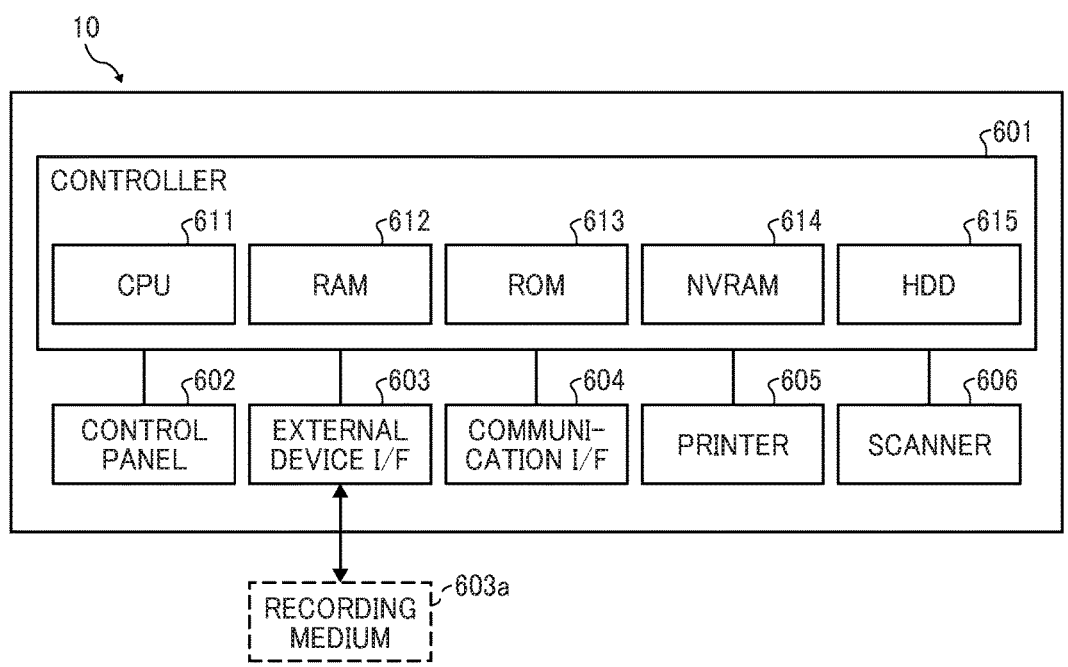
FIG. 3 is a hardware configuration diagram of an example of an output device.

The output device 10 in FIG. 1 is implemented by a computer having a hardware configuration as illustrated in FIG. 3 in the case of a multifunction peripheral, for example. FIG. 3 is a hardware configuration diagram of an example of the output device. The output device 10 illustrated in FIG. 3 includes a controller 601, a control panel 602, an external device I/F 603, a communication I/F 604, a printer 605, a scanner 606, and the like.

The controller 601 includes a CPU 611, a RAM 612, a ROM 613, a nonvolatile RAM (NVRAM) 614, an HDD 615, and the like. The ROM 613 stores various programs and data. The RAM 612 temporarily holds programs and data. The NVRAM 614 stores setting information and the like. Further, the HDD 615 stores various programs and data.

The CPU 611 reads the programs and data, the setting information, and the like from the ROM 613, the NVRAM 614, and the HDD 615 onto the RAM 612 and executes processing to implement control and functions of the entire output device 10.

The control panel 602 includes an input unit that accepts an input from the user and a display that performs display. The external device I/F 603 is an interface with an external device. Examples of the external device include a recording medium 603a and the like. The output device 10 reads data from and/or write data on the recording medium 603a via the external device I/F 603. Examples of the recording medium 603a include an integrated circuit (IC) card, a flexible disk, a CD, a DVD, an SD memory card, a USB memory, and a subscriber identity module (SIM) card, for example.

The communication I/F 604 is an interface for connecting the output device 10 to the network 60. The output devices 10 performs data communication via the communication I/F 604. The printer 605 is a printing device for printing print data on a conveyed object. The conveyed object is not limited to paper, examples of which include a coated paper, a thick paper, an overhead projector (OHP) sheet, a plastic film, a prepreg, and a copper foil. The scanner 606 is a reading device for reading image data (electronic data) from a document. FIG. 3 illustrates a mere example of the case where the output device 10 is a multifunction peripheral, and the output device 10 does not necessarily include the printer 605 and the scanner 606 in the case where the output device 10 is not a multifunction peripheral as described above. Further, the output device 10 may include hardware other than the constituent elements illustrated in FIG. 3, such as a camera, a lamp light source, and a touch panel.

<Software Configuration>

<<Daily Report DB Server>>

Figure 4:
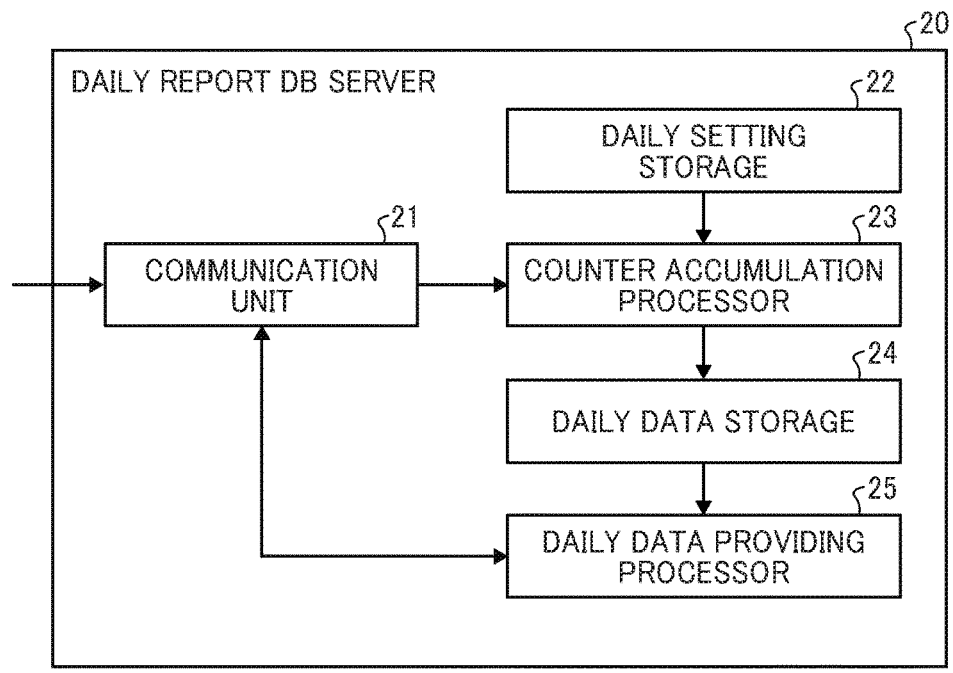
FIG. 4 is a processing block diagram of an example of a daily report database (DB) server according to the present embodiment.

The daily report DB server 20 according to the present embodiment is implemented by the processing blocks illustrated in FIG. 4, for example. FIG. 4 is a processing block diagram of an example of the daily report DB server according to the present embodiment. The daily report DB server 20 executes a program to implement the processing blocks illustrated in FIG. 4.

The daily report DB server 20 in FIG. 4 implements a communication unit 21, a daily setting storage 22, a counter accumulation processor 23, a daily data storage 24, a daily data providing processor 25. The communication unit 21 performs data communication with the outside, such as with another device.

The daily setting storage 22 stores daily setting described below. The daily setting is information used for accumulating the counter values in the counter accumulation processor 23. The counter accumulation processor 23 stores the counter value received by the communication unit 21 and the daily data of each output device 10 generated on the basis of the daily setting in the daily data storage 24. The daily data storage 24 stores the daily data of each output device 10.

The daily data providing processor 25 provides the daily data of each output device 10 stored in the daily data storage 24 to the monthly report DB server 30 by the communication unit 21 in response to a request from the monthly report DB server 30. Further, the daily data providing processor 25 provides the daily data stored in the daily data storage 24 to the report generation server 40 by the communication unit 21 in response to a request from the report generation server 40.

<<Monthly Report DB Server>>

Figure 5:
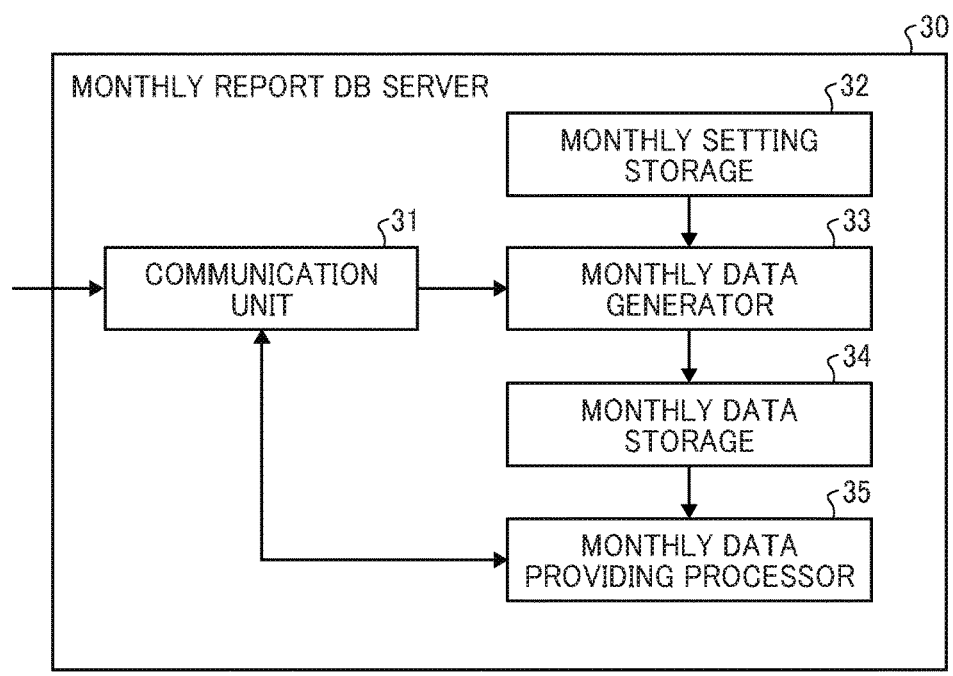
FIG. 5 is a processing block diagram of an example of a monthly report DB server according to the present embodiment.

The monthly report DB server 30 according to the present embodiment is implemented by the processing blocks illustrated in FIG. 5, for example. FIG. 5 is a processing block diagram of an example of the monthly report DB server according to the present embodiment. The monthly report DB server 30 executes a program to implement the processing blocks illustrated in FIG. 5.

The monthly report DB server 30 in FIG. 5 implements a communication unit 31, a monthly setting storage 32, a monthly data generator 33, a monthly data storage 34, and a monthly data providing processor 35. The communication unit 31 performs data communication with the outside.

The monthly setting storage 32 stores monthly setting described below. The monthly setting is information used for reconstructing and storing the daily data in a form (for example, monthly data by year and month, group, or counter type) suitable for analysis in the monthly data generator 33. The monthly setting includes, for example, group information, device information, device history information, and the like described later.

The monthly data generator 33 reconstructs the daily data of each output device 10 by condition (by year and month, year, group, or counter type) suitable for analysis on the basis of the daily data and the monthly setting, and causes the monthly data storage 34 to store the reconstructed monthly data. The monthly data generator 33 sends a monthly data generation completion notification described below to the report generation server 40 by the communication unit 31.

The monthly data storage 34 stores the monthly data by condition. Further, the monthly data providing processor 35 provides the monthly data by condition stored in the monthly data storage 34 to the report generation server 40 by the communication unit 31 in response to a request from the report generation server 40.

<<Report Generation Server>>

Figures 6, 7:
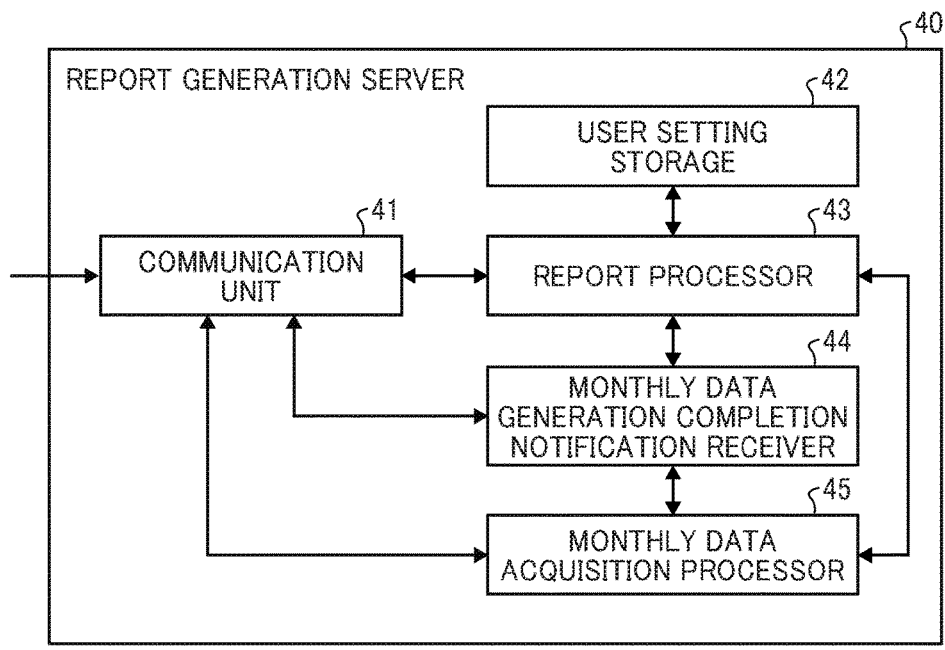
FIG. 6 is a processing block diagram of an example of a report generation server according to the present embodiment.
FIG. 7 is a conceptual diagram of an example of daily setting.

The report generation server 40 according to the present embodiment is implemented by the processing blocks illustrated in FIG. 6, for example. FIG. 6 is a processing block diagram of an example of the report generation server according to the present embodiment. The report generation server 40 executes a program to implement the processing blocks illustrated in FIG. 6. The report generation server 40 implements a communication unit 41, a user setting storage 42, a report processor 43, a monthly data generation completion notification receiver 44, and a monthly data acquisition processor 45. The communication unit 41 performs data communication with the outside, such as with another device.

The user setting storage 42 stores user setting described below. The report processor 43 generates a web page of a report on the basis of a request from the client terminal 12 received by the communication unit 41 or a notification notifying reception of the monthly data generation completion notification from the monthly data generation completion notification receiver 44.

The report processor 43 transmits the web page to the client terminal 12 by the communication unit 41 to cause the web browser mounted on the client terminal 12 to display the report. Further, the report processor 43 requests the monthly data acquisition processor 45 to acquire the daily data of the output device 10 and the monthly data by condition if required for generation of the web page.

The monthly data generation completion notification receiver 44 receives the monthly data generation completion notification from the monthly report DB server 30, and notifies the report processor 43 of reception of the monthly data generation completion notification. Further, the monthly data acquisition processor 45 acquires the monthly data by condition requested by the report processor 43 from the monthly report DB server 30 by the communication unit 41, and provides the monthly data to the report processor 43.

<<Various Data Configuration>>

FIG. 7 is a configuration diagram of an example of the daily setting. The daily setting includes a device identification (ID), a media access control (MAC) address, and a daily data ID, as items. The device ID is an example of identification information for uniquely identifying the output device 10. The MAC address is an example of identification information for uniquely identifying the output device 10 on a communication network. Further, the daily data ID is an example of identification information for uniquely identifying the daily data of the output device 10 specified by the device ID or the MAC address. The device ID is a concept including an IP address, a serial number, and the like. Further, the device ID also includes an ID number recorded on a recording medium connected to the output device 10.

FIG. 8 is a configuration diagram of an example of daily data. The daily data includes a daily data ID, year-month-day, and various counter values, as items. The daily data ID is an example of identification information for uniquely identifying the daily data. The year-month-day is a date on which various counter values of the daily data are counted. The various counter values are daily counter values, and different types of counter values such as a total (total value) of the counter values, and counter values by function of the output device 10, such as counter values by color (color, monochrome, or the like), by sheet size (A3, A4, or the like), and the like.

FIG. 9 is a configuration diagram of an example of group information. The group information includes a group ID, a group name, an address, a telephone number, an electronic mail (e-mail) address, and a closing date, as items. The group ID is an example of identification information for uniquely identifying a group such as a company ID. The group indicates an organization configured in predetermined units, examples of which include companies, parties, departments, or the like. The group name is a name of the group such as a company name. The address, the telephone number, the e-mail address, and the closing date are an address, a telephone number, an e-mail address, and a closing date of the group. Note that the closing date is a reference date for generating the monthly data from the daily data. The e-mail address is an e-mail address of the group, and an e-mail address of a user or an administrator who belongs to the group may be registered.

FIG. 10 is a configuration diagram of an example of the device information. The device information includes a device ID, a group ID, a MAC address, a daily data ID, and a monthly data ID, as items. The device information associates the device ID, the group ID, and the MAC address with one another to associate the group with the output device 10 used by the group.

Further, the device information associates the group ID, the daily data ID, and the monthly data ID with one another to associate the group with the daily data and the monthly data of the group. Further, the device information associates the device ID, the MAC address, the daily data ID, and the monthly data ID with one another to associate the output device 10 with the daily data and the monthly data of the output device 10.

FIG. 11 is a configuration diagram of an example of device history information. The device history information includes, for example, a device ID, an update date, and a group ID, as items. The device history information is information indicating a transition of the group to which the output device 10 identified by the device ID has belonged. The update date indicates a date on which the group to which the output device 10 belongs has changed. The monthly report DB server 30 extracts one or more records from the device history information illustrated in FIG. 11, using the device ID, to determine the group ID of the group to which the output device 10 has belonged and a period in which the output device 10 has belonged to the group.

FIG. 12 is a configuration diagram of an example of the monthly data. The monthly data includes a monthly data ID, year and month, and various counter values, as items. The monthly data ID is an example of identification information for uniquely identifying the monthly data. The year and month indicate year and month when the various counter values of the monthly data are counted. The various counter values are monthly counter values and are different types of counter values such as a total of the counter values, and counter values by function, by color, by sheet size, and the like.

FIG. 13 is a configuration diagram of an example of user setting. The user setting includes a group ID, a user ID, a user name, a password, report language setting, report notification setting, report distribution setting, and a user e-mail address, as items. The group ID is an example of identification information for uniquely identifying the group to which the user belongs. The user ID is an example of identification information for uniquely identifying the user. The user name is a name of the user. The password is an example of authentication information used by the user.

The report language setting sets a language of a report to be generated. For example, when the report language setting is "JP", a Japanese report is generated. When the report language setting is "US", an English report is generated. The report notification setting is information indicating whether the report generation server 40 that has received the monthly data generation completion notification notifies the user that a report can be generated. The report distribution setting is information indicating whether the report generation server 40 that has received the monthly data generation completion notification generates a report and distributes the report to the user. The user e-mail address is information indicating a distribution destination of the generated report.

<Processing>
<<Counter Accumulation Processing>>

Figure 14:
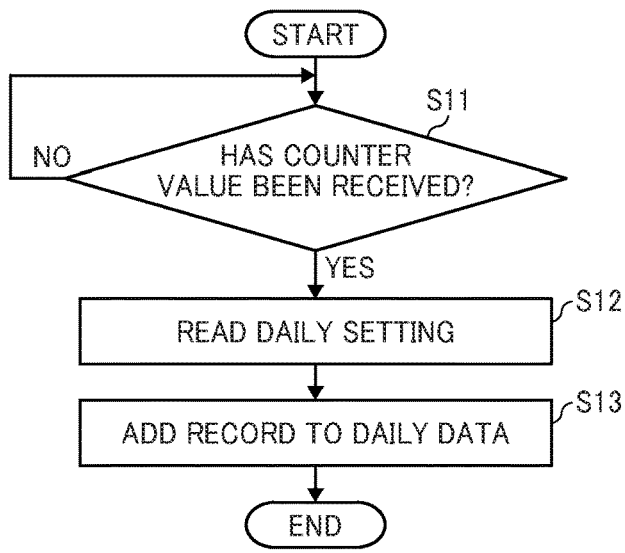
FIG. 14 is a flowchart of an example illustrating a procedure of counter accumulation processing.

The daily report DB server 20 of the information processing system 1 according to the present embodiment performs counter accumulation processing by the procedure in FIG. 14, for example. FIG. 14 is a flowchart of an example illustrating the procedure of the counter accumulation processing.

The counter accumulation processor 23 of the daily report DB server 20 waits in step S11 until the counter accumulation processor 23 receives the counter value associated with the device ID or the MAC address from the output device 10 or the relay device 14 in the user site. When the counter accumulation processor 23 receives the counter value associated with the device ID or the MAC address, the processing proceeds to step S12 and the counter accumulation processor 23 reads a record of counter setting in FIG. 7 from the daily setting storage 22, using the device ID or the MAC address.

The processing proceeds to step S13. The counter accumulation processor 23 causes the daily data storage 24 to store a record of the daily data in FIG. 8, which has been generated by adding the daily data ID to the received counter value based on the record of the counter setting read in step S12.

Accordingly, the daily report DB server 20 accumulates, for each output device 10, the counter value on a daily basis.

<<Device Group Selection Processing>>

Figure 15:
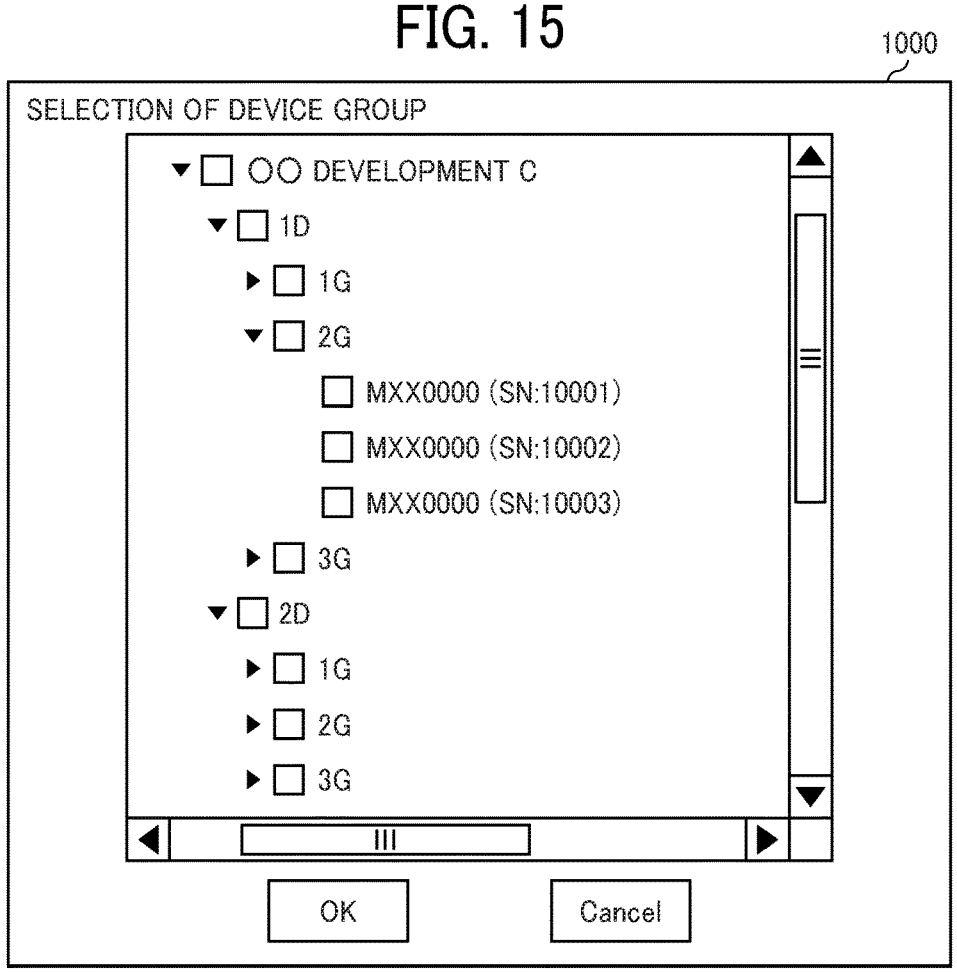
FIG. 15 is an illustration of an example device group selection screen.

The report generation server 40 of the information processing system 1 according to the present embodiment displays a device group selection screen 1000 as illustrated in FIG. 15, for example, on the client terminal 12, and receives selection of a group to which the output device 10 belongs from the user. For example, the device group selection screen 1000 in FIG. 15 illustrates an example in which the output devices 10 with the device IDs "10001", "10002", and "10003" belong to a group "2G".

The user drags and drops the device ID displayed on the device group selection screen 1000 in FIG. 15, for example, to change the group to which the output device 10 corresponding to the device ID belongs. The group ID associated with the device ID of the output device 10 is changed and the update date is recorded by the change of the group to which the output device 10 belongs, which has been performed on the device group selection screen 1000 in FIG. 15. Accordingly, the device information in FIG. 10 and the device history information in FIG. 11 are updated.

The group may be hierarchized as illustrated on the device group selection screen 1000. In this case, the group information illustrated in FIG. 9 may be managed in association with the group ID of a parent group or a child group. Further, a plurality of the group IDs may be associated to one another and managed in the device information illustrated in FIG. 10 and the device history information illustrated in FIG. 11.

<<Report Processing>>

Figure 16:
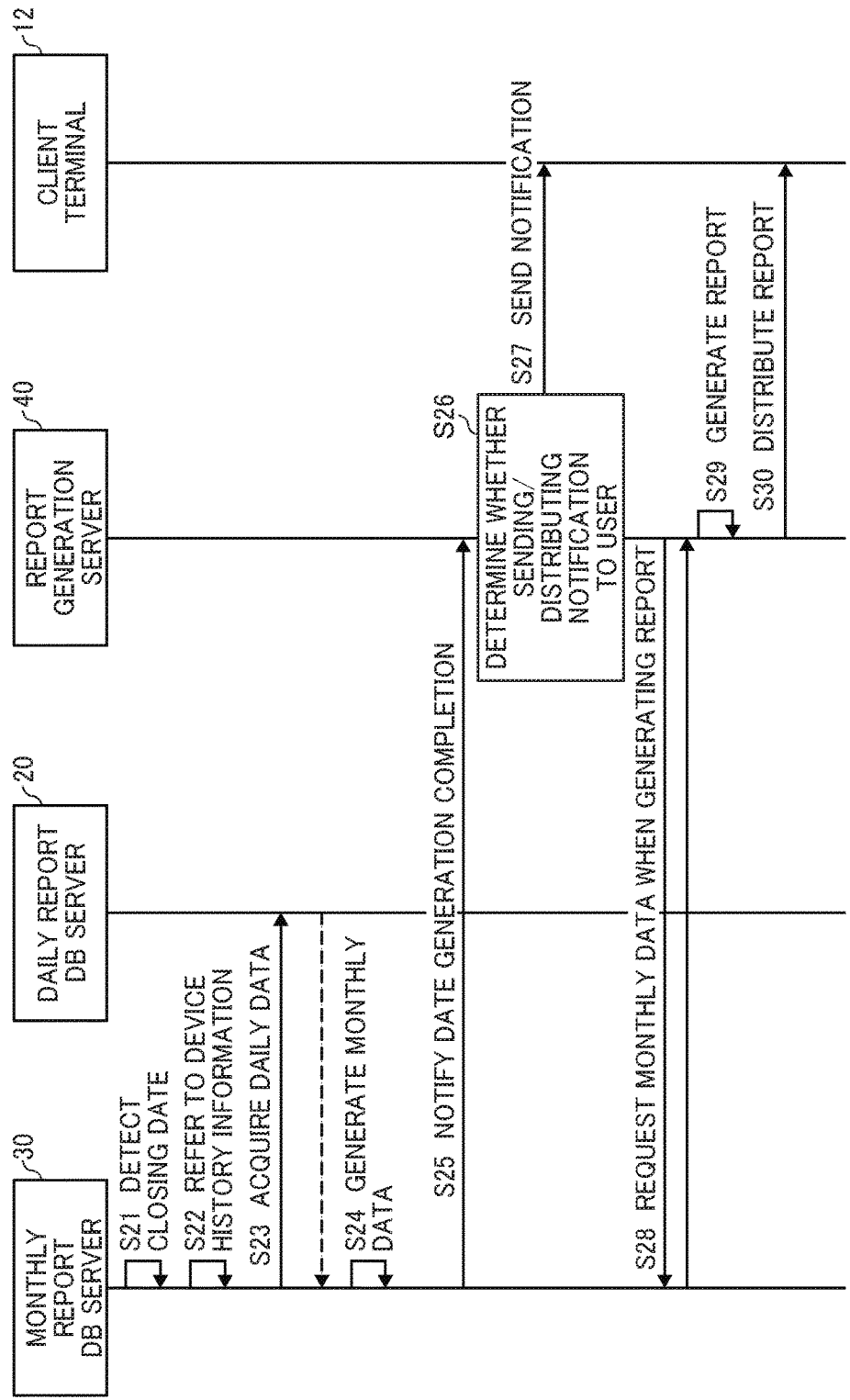
FIG. 16 is a sequence diagram of an example of report processing.

The information processing system 1 according to the present embodiment performs report processing by the procedure in FIG. 16, for example. FIG. 16 is a sequence diagram of an example of report processing.

At step S21, the monthly data generator 33 of the monthly report DB server 30 detects the group ID of the group with an elapsed closing date on the basis of the current date and the closing date included in the group information by reference to the closing date of the group information in FIG. 9 included in the monthly setting. The processing of step S21 is repeated at predetermined time intervals. In step S22 and in subsequent steps, the monthly report DB server 30 generates monthly data of the group of which the group ID has been extracted in step S21.

At step S22, the monthly data generator 33 extracts the device ID of the output device 10 having belonged to the group of the group ID extracted in step S21 during a monthly date generation period and a belonging period of the output device 10 by reference to the update date and the group ID of the device history information in FIG. 11. In the processing of step S22, even if the output device 10 of which the belonging group has been changed during the monthly data generation period is included, the belonging period during which the output device 10 having belonged to the group is determined on the basis of the update date.

At step S23, the monthly data generator 33 requests the daily report DB server 20 to acquire the daily data of the output device 10 having belonged to the group and acquires the daily data, in consideration of the belonging period in which the output device 10 has belonged to the group. Specifically, the monthly data generator 33 transmits, for the device ID of the output device 10 extracted in step S22, a request of the daily data included in the belonging period extracted in step S22 by the communication unit 31. The daily report DB server 20 provides by transmitting, by the daily data providing processor 25, the daily data of each output device 10 stored in the daily data storage 24 from the communication unit 21 to the monthly report DB server 30 in response to the request received by the communication unit 21.

At step S24, the monthly data generator 33 generates the monthly data illustrated in FIG. 12 from the daily data acquired from the daily report DB server 20, and causes the monthly data storage 34 to store the monthly data. At step S25, the monthly data generator 33 sends a notification indicating completion of the monthly data ("monthly data generation completion notification") to the report generation server 40.

The monthly data generation completion notification receiver 44 of the report generation server 40, which has received the monthly data generation completion notification from the monthly report DB server 30, notifies the report processor 43 of the reception of the monthly data generation completion notification. When there is the notification of the reception of the monthly data generation completion notification from the monthly data generation completion notification receiver 44, the report processor 43 extracts the record of the group ID of the generated and completed monthly data by reference to the user setting in FIG. 13.

The report processor 43 refers to ON/OFF of "report notification setting" for each extracted record. The report processor 43 performs the processing of step S27 for the record in which the "report notification setting" is "ON". The report processor 43 distributes an e-mail notifying that a report can be generated to the user e-mail address set in the record in which the "report notification setting" is "ON". Note that the notification by e-mail distribution is an example and may be given to the user by other means. For example, notification by distributing a real-time message such as a text chat may be used.

In addition, the report processor 43 refers to ON/OFF of "report distribution setting" for each extracted record. The report processor 43 performs the processing of step S28 and subsequent steps for the record in which the "report distribution setting" is "ON". In step S28, the report processor 43 requests the monthly report DB server 30 to acquire the monthly data used for generating the report and acquires the monthly data.

At step S29, the report processor 43 generates a report, using the monthly data acquired from the monthly report DB server 30. Then, the processing proceeds to step S30, and the report processor 43 transmits the report generated in step S29 to the user e-mail address set in the record in which the "report distribution setting" is "ON" to distribute the report.

When both the "report notification setting" and the "report distribution setting" are "ON", the report processor 43 may perform the distribution of the generated report without performing notification in step S27 because the distribution serves the notification as well. Further, when both the "report notification setting" and the "report distribution setting" are "OFF", the report processor 43 does perform neither the notification notifying that a report can be generated nor the distribution of a generated report.

For example, in the example of the user setting illustrated in FIG. 13, an e-mail notifying that a report can be generated is transmitted to the user e-mail address of the user name "Nomura". In the example of the user setting illustrated in FIG. 13, the distribution of the generated report is performed for the user e-mail address of the user name "Suzuki". In the example of the user setting illustrated in FIG. 13, neither the notification notifying that a report can be generated nor the distribution of a generated report is performed for the user e-mail address of the user name "Satoh".

In the sequence diagram in FIG. 16, an example of generating the monthly data from the daily data on the closing date set for each group has been described. However, a weekly data, a quarterly data, or annual data may be generated in place of the monthly data.

Figures 17A, 17B:
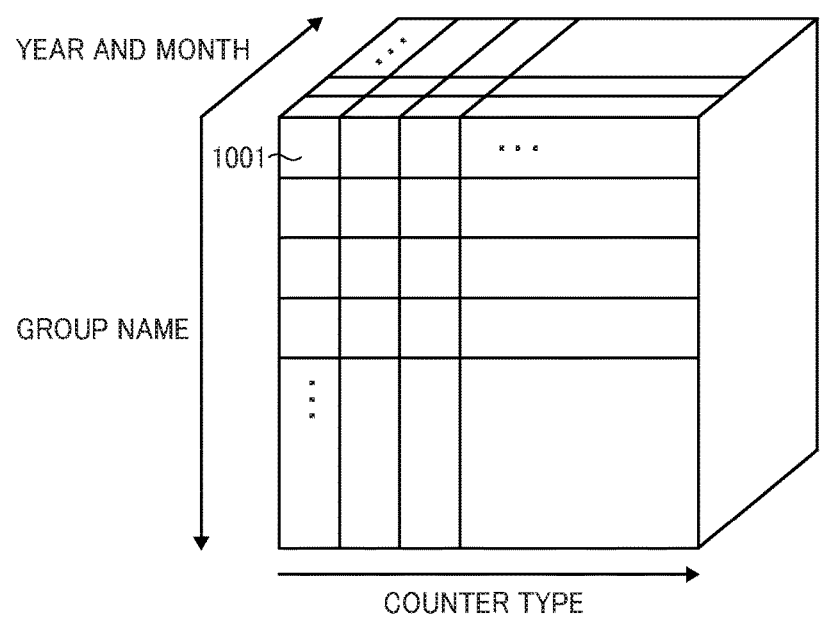
FIGS. 17A and 17B are diagrams illustrating an example of an online analysis processing (OLAP) cube.

In step S24, the monthly data generator 33 generates an OLAP cube 1001 as illustrated in FIGS. 17A and 17B, for example, as the monthly data by condition (by year and month, group, a counter type, or the like) suitable for an analysis from the acquired daily data. FIGS. 17A and 17B are diagrams illustrating an example of an OLAP cube.

FIG. 17A is a configuration diagram of monthly data of an example of the OLAP cube 1001 generated on the basis of the acquired daily data. The OLAP cube 1001 in FIG. 17A sets the group name, the year and month, the device, and the counter type. The OLAP cube 1001 in FIG. 17A indicates that the counter value can be analyzed by the year and month, the group name, and the counter type, as illustrated in FIG. 17B. In FIG. 17B, the OLAP cube 1001 is added in the year and month (time) axis direction when the closing date of the group elapses. For example, to acquire the monthly data corresponding to the specified group and year and month, the group name can be specified from the group information illustrated in FIG. 9 if the group ID and the year and month can be specified. Therefore, the monthly data of the specified group name and the specified year and month can be extracted and acquired from the OLAP cube 1001. Note that the group ID, not the group name, may be set as the condition of the OLAP cube 1001.

Although the OLAP 1001 cube has been described as an example of a data structure of a database, the data may be managed in a database having another data structure format.

<<Report Display Processing>>

Figure 18:
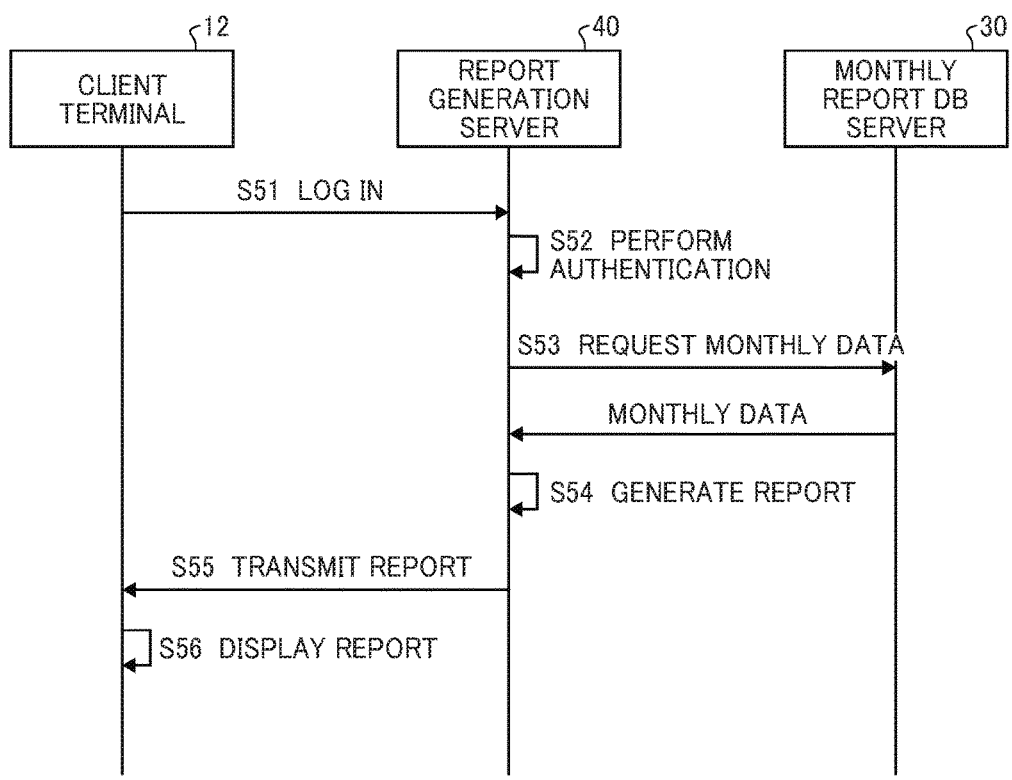
FIG. 18 is a sequence diagram of an example illustrating a procedure of report display processing.

The information processing system 1 according to the present embodiment performs report display processing by the procedure in FIG. 18, for example. FIG. 18 is a sequence diagram of an example illustrating the procedure of the report display processing.

In step S51, the user such as an administrator in the user site operates the client terminal 12 and transmits a login request to the report generation server 40. The report generation server 40 stores and manages the user ID and the group ID of the group to which the user belongs in association with each other as the user information. In step S52, the report generation server 40 authenticates the user who has requested the login on the basis of a password of the user included in the login request received by the communication unit 41. FIG. 18 illustrates an example in which the authentication has succeeded. If the authentication fails, the processing of step S53 and subsequent steps is not performed.

At step S53, the monthly data acquisition processor 45 of the report generation server 40 specifies the group ID associated with the user ID of the user whose login authentication has been succeeded, and acquires the monthly data associated with the specified group ID from the monthly report DB server 30. Specifically, the monthly data acquisition processor 45 specifies the group ID associated with the user ID of the logged-in user, transmits a request of the monthly data associated with the specified group ID to the monthly report DB server 30 by the communication unit 41, and receives the monthly data transmitted from the monthly report DB server 30 in response to the request by the communication unit 41.

Figure 19:
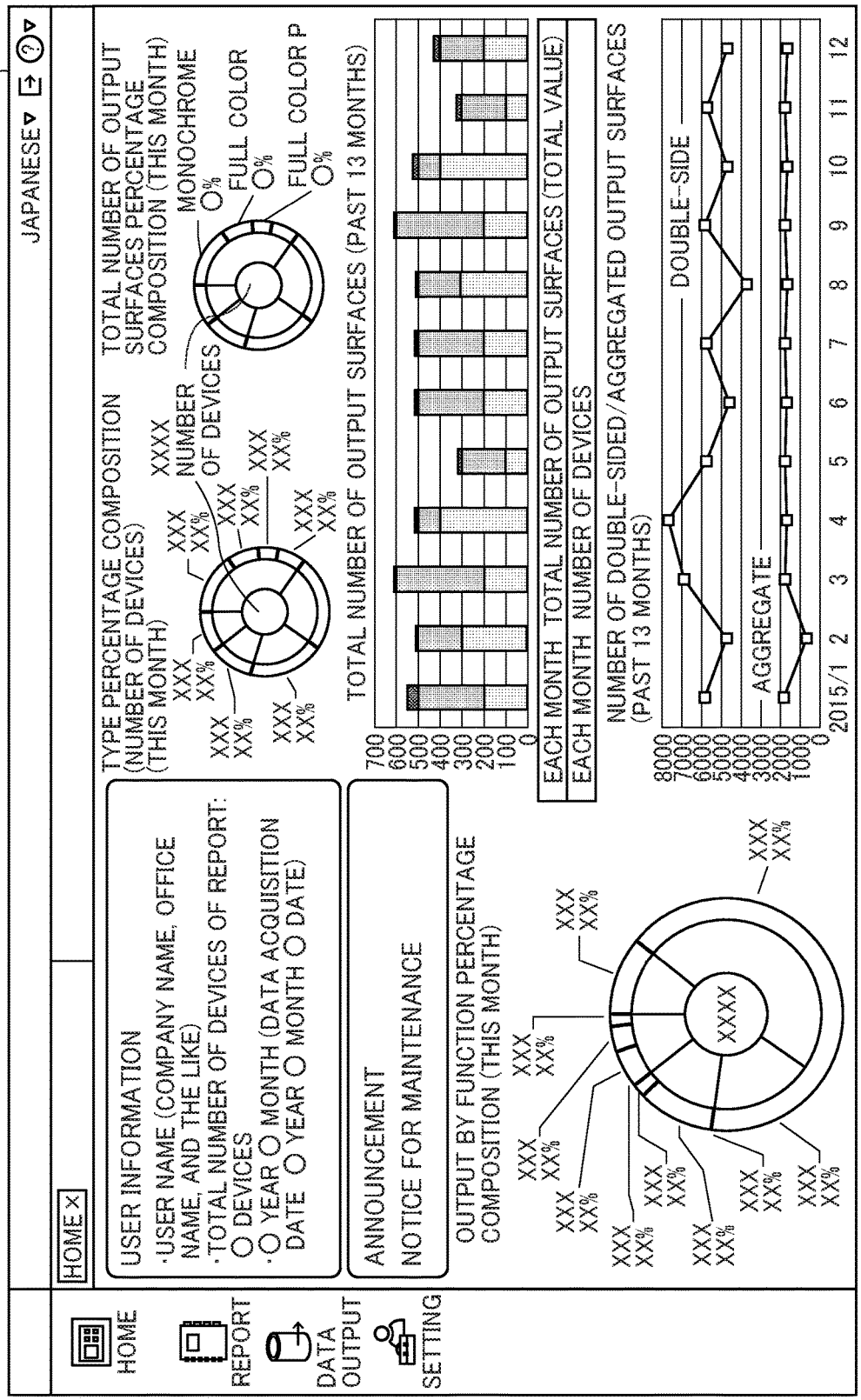
FIG. 19 is an illustration of a screen with an example of a report.

At step S54, the report processor 43 of the report generation server 40 generates screen data of a report 1100 from the monthly data received and acquired from the monthly report DB server 30. The processing proceeds to step S55, and the report generation server 40 transmits the screen data of the report 1100 to the client terminal 12. The web browser of the client terminal 12, which has received the screen data of the report 1100, displays the report 1100 illustrated in FIG. 19, for example, in step S56. FIG. 19 is a screen image diagram of an example of the report.

As described above, in the first embodiment, a notification is sent to the user when the monthly data is generated to be ready for generating a monthly report. With this notification, the user is able to know that the monthly report can be generated. Alternatively, depending on the setting set for each user, a monthly report may be automatically transmitted to the user whenever it is ready.

[Second Embodiment]

In a second embodiment, a time difference of a place where an output device 10 is installed is taken into consideration. FIG. 20 is a diagram for explaining a time difference. In recent years, even the output devices 10 of the same group in the same company may be separately installed worldwide. The group having the output devices 10 installed worldwide places importance on a time to notify monthly data generation completion on a closing date of the group.

As illustrated in FIG. 20, there is case where the output devices 10 belonging to the same group of the same company are separately installed in the United Kingdom, (England) China, and Japan, and there is also a case where there is a time difference between the west and the east like in the United States of America. There is a problem of which time zone the closing date should be adjusted. In the second embodiment, information of the time zone is associated and managed with each of the output devices 10. When the monthly report DB server 30 confirms that the monthly data of the output device 10 in the latest time zone, of the time zones of the output devices 10 belonging to the same group, is included, the monthly report DB server 30 notifies monthly data generation completion.

When the monthly data of the output device 10 in the latest time zone, of the time zones of the output devices 10 belonging to the same group, is included, there is no insufficient monthly data of the group. As described above, in the second embodiment, the monthly data generation completion is notified without insufficiency of data even if there are output devices 10 in different time zones.

An information processing system 1 according to the second embodiment performs report processing by the procedure in FIG. 21, for example. FIG. 21 is a sequence diagram of an example of the report processing, according to the second embodiment. At step S101, the monthly report DB server 30 executes timer of each one hour, and performs processing of step S102 and subsequent steps in each one hour. Note that the monthly report DB server 30 may start the execution of timer of each one hour in step S101 after the monthly data of the output device 10 in a region where change of date is earliest, that is, in a region where the time zone is largest, is generated.

The processing proceeds to step S102, and the monthly data generator 33 of the monthly report DB server 30 requests the daily report DB server 20 to acquire the daily data of the output device 10 belonging to the same group. In step S103, the monthly data generator 33 generates the monthly data illustrated in FIG. 12 from the acquired daily data, and causes the monthly data storage 34 to store the monthly data.

The processing proceeds to step S104. The monthly data generator 33 determines whether to send the monthly data generation completion notification to the report generation server 40 as follows. The monthly data generator 33 specifies all the device IDs associated with the same group ID by reference to the device information in FIG. 10.

Next, the monthly data generator 33 specifies all the time zones of the device ID associated with the same group ID by reference to the time zone information in FIG. 22. FIG. 22 is a configuration diagram of an example of time zone information. The time zone information of FIG. 22 is stored in the monthly setting storage 32, for example.

The time zone information in FIG. 22 includes the device ID, the MAC address, the daily data ID, and the time zone, as items. A larger time is set as the change of date is earlier and a smaller time is set as the change of date is later to the time zone. In the example in FIG. 22, the region where a device ID "DDD" is installed is a region where change of the date is latest.

The monthly data generator 33 specifies the device ID "DDD" installed in a region of the time zone "−8:00" where the change of date is latest, of the specified time zones. The monthly data generator 33 determines whether the monthly data of the specified device ID "DDD" is included in the monthly data generated in step S103.

When the monthly data generator 33 determines that the monthly data of the specified device ID "DDD" is included in the monthly data generated in step S103, the monthly data generator 33 determines to send the monthly data generation completion notification to the report generation server 40 and performs processing of step S105 and subsequent steps. The processing of steps S105 and S106 in FIG. 21 is similar to the processing of steps S25 and S27 in FIG. 16. Therefore, after the processing of step S105, determination of step S26 in FIG. 16 and processing of steps S27 to S30 may be performed.

On the other hand, when the monthly data generator 33 determines that the monthly data of the specified device ID "DDD" is not included in the monthly data generated in step S103, the monthly data generator 33 returns to step S101 because the monthly data used for generation of a report is not completed.

According to the processing in the sequence diagram in FIG. 21, the monthly data generation completion notification is sent to the report generation server 40 at a time when the monthly data of the output device 10 installed in the region where the change of date is latest is generated.

The monthly report DB server 30 may cause the monthly setting storage 32 to include the information illustrated in FIG. 23, for example. FIG. 23 is a conceptual diagram of an example of the information stored in the monthly setting storage.

The present invention is not limited to the above specifically disclosed embodiments, and various modifications and changes can be made without departing from the scope of the claims.

In this disclosure, the daily data storage 24 is an example of a memory that stores first use log information indicating a log of uses of an output device collected for a first time period. The monthly data generator 33 is an example of a function provided by circuitry that generates second use log information indicating a log of uses of the output device for a second time period, from the first use log information of the output device for the first time period. The second time period, i.e., one month, is longer than the first time period, i.e., one day. The monthly data storage 34 is an example of a memory that stores the second use log information. The report processor 43 is an example of a function provided by circuitry that generates information to be provided to a user, such as a report.

Examples of use log information include, but not limited to, various types of counter value collected from each output device such as a time spent to use the output device 10, a data size and the number of images captured by the output device 10, a communication data size of the output device 10, and a time spent by the output device 10 to output data and a data size to be output by the output device 10.

Further, the information processing system 1 of any one of the above-described embodiments may be implemented in various other ways. For example, any number of servers in the service provider site may be integrated into one server. For example, any combination of the daily report DB server 20, the monthly report DB server 30, and the report generation server 40 may be integrated into one server. In such case, the functional units described above referring to FIGS. 4 to 6 may be combined into any number of functional units.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system comprising:
a first server including first circuitry configured to generate and store in a first memory, first use log information indicating a log of uses of an output device collected for a first time period;
a second server including second circuitry configured to:
generate and store in a second memory, second use log information indicating a log of uses of the output device for a second time period, from the first use log information of the output device for the first time period obtained from the first server, the second time period being relatively longer than the first time period; and
send a notification indicating completion of generation of the second use log information; and
a third server including
third circuitry configured to generate information to be provided to a user, using the second use log information of the output device for the second time period obtained from the second server, in response to the notification indicating completion of generation of the second use log information, and
a third memory configured to store, for each of a plurality of users including the user, a notification setting indicating whether or not to notify that the information to be provided to the user is generatable, and a distribution setting indicating whether or not to automatically distribute the information to be provided to the user,
wherein, upon the distribution setting indicating to automatically distribute the information to be provided to the user, the third circuitry is configured to generate and automatically distribute the information, to be provided to the user, to a destination set for the user, in response to the notification indicating completion of generation of the second use log information, and
wherein, upon the distribution setting indicating not to automatically distribute the information to be provided to the user, and the notification setting indicating to notify that the information to be provided to the user is generatable, the third circuitry is configured to send, to the destination set for the user, a notification indicating that the information to be provided to the user is generatable, and is configured to generate and distribute the information to be provided to the user in response to a request from the user who has been notified.

2. The information processing system of claim 1, wherein the output device includes a plurality of output devices that are installed at a plurality of regions that differ in time zones, and
wherein the second circuitry is configured to send the notification indicating completion of generation of the second use log information, after completion of generating the output device installed in a region where change of date is relatively, latest, determined based on information of a time zone of the output device.

3. The information processing system of claim 1, wherein the output device includes a plurality of output devices each belonging to a specific group, and
the second circuitry is configured to generate, based on a closing date set to each group to which the output device belongs, the second use log information of the output device belonging to each group for the second time period.

4. An information processing apparatus comprising:
circuitry configured to:
generate and store in a memory, first use log information indicating a log of uses of an output device collected for a first time period;
generate and store in the memory, second use log information indicating a log of uses of the output device for a second time period, from the first use log information of the output device for the first time period, the second time period being relatively longer than the first time period; and
generate information to be provided to a user, using the second use log information of the output device for the second time period, in response to completion of generation of the second use log information; and
a memory configured to store, for each user, a notification setting indicating whether or not to notify that the information to be provided to the user is generatable, and a distribution setting indicating whether or not to automatically distribute the information to be provided to the user,
wherein, upon the distribution setting indicating to automatically distribute the information, to be provided to the user, the circuitry is configured to generate and automatically distribute the information to be provided to the user to a destination set for the user, in response to the completion of generation of the second use log information, and
wherein, upon the distribution setting indicating not to automatically distribute the information to be provided to the user, and the notification setting indicating to notify that the information to be provided to the user is generatable, the circuitry is configured to send, to the destination set for the user, a notification indicating that the information to be provided to the user is generatable, and is configured to generate and distribute the information to be provided to the user in response to a request from the user who has been notified.

5. The information processing apparatus of claim 4, wherein the output device includes a plurality of output devices that are installed at a plurality of regions that differ in time zones, and
wherein the circuitry is configured to determine completion of generation of the second use log information, after completion of generating the output device installed in a region where change of date is relatively latest, determined based on information of a time zone of the output device.

6. The information processing apparatus of claim 4, wherein the output device includes a plurality of output devices each belonging to a specific group,
the circuitry is configured to generate, based on a closing date set to each group to which the output device belongs, the second use log information of the output device belonging to each group for the second time period.

7. An information processing method comprising:
using a first server, generating first use log information indicating a log of uses of an output device collected for a first time period;
using a second server, generating second use log information indicating a log of uses of the output device for a second time period, from the first use log information of the output device for the first time period, the second time period being relatively longer than the first time period;
sending a notification indicating completion of generation of the second use log information, from the second server to a third server; and
using the third server, generating information to be provided to a user, using the second use log information of the output device for the second time period, in response to the notification indicating completion of generation of the second use log information; and
storing, for each user, a notification setting indicating whether or not to notify that the information to be provided to the user is generatable, and a distribution setting indicating whether or not to automatically distribute the information to be provided to the user,
wherein, upon the distribution setting indicating to automatically distribute the information to be provided to the user, the generating of the information to be provided to the user includes
generating and automatically distributing the information to be provided to the user to a destination set for the user, in response to the notification indicating completion of generation of the second use log information, and
wherein, upon the distribution setting indicating not to automatically distribute the information to be provided to the user, and the notification setting indicating to notify that the information to be provided to the user is generatable, the generating of information to be provided to a user includes
sending, to the destination set for the user, a notification indicating that the information to be provided to the user is generatable, and
generating the information to be provided to the user in response to a request from the user who has been notified.

8. The information processing method of claim 7, wherein, upon the output device including a plurality of output devices that are installed at a plurality of regions that differ in time zones, the sending of a notification includes:
sending the notification indicating completion of generation of the second use log information, after completion of generating the output device installed in a region where change of date is relatively latest, which is determined based on information of a time zone of the output device.

9. The information processing method of claim 7, wherein, upon the output device including a plurality of output devices each belonging to a specific group, the generating of second use log information includes:
generating, based on a closing date set to each group to which the output device belongs, the second use log information of the output device belonging to each group for the second time period.

* * * * *